United States Patent [19]

Eaton et al.

[11] 3,924,245

[45] Dec. 2, 1975

[54] STACK MECHANISM FOR A DATA PROCESSOR

[75] Inventors: John Richard Eaton, Haslingden, England; Philip Ronald Brady, Swansea, Wales

[73] Assignee: International Computers Ltd., England

[22] Filed: July 16, 1974

[21] Appl. No.: 488,907

[30] Foreign Application Priority Data

July 18, 1973 United Kingdom .............. 34215/73

[52] U.S. Cl. .............................................. 340/172.5

[51] Int. Cl.² .......................................... G06F 13/00

[58] Field of Search .................................. 340/172.5

[56] References Cited

UNITED STATES PATENTS

| | | | |
|---|---|---|---|
| 3,461,434 | 8/1969 | Barton | 340/172.5 |
| 3,699,528 | 10/1972 | Carlson | 340/172.5 |
| 3,868,644 | 2/1975 | Healey | 340/172.5 |

*Primary Examiner*—Gareth D. Shaw

*Assistant Examiner*—James D. Thomas

*Attorney, Agent, or Firm*—Misegades, Douglas & Levy

[57] ABSTRACT

Information of two categories (e.g. two different types of microprogram material) are written into respective stacks in a store, the stacks advancing towards each other from separate base addresses as information is added to them. In this way, the two categories of information share the same storage space, and the space is utilised in an efficient manner while preserving sequential addresses within the two categories. One stack has priority over the other. This is achieved by removing all the information in the lower priority stack when there is not enough room to add new information to the higher priority stack.

6 Claims, 6 Drawing Figures

STACK MECHANISM FOR A DATA PROCESSOR

BACKGROUND OF THE INVENTION

This invention relates to data processing systems and is particularly, although not exclusively concerned with facilities for overlaying blocks of program material in a store.

One problem which arises in data processing systems is that of allocation of storage space for a number of different categories of information, where the amount of information to be stored in each category varies during the course of operation of the system. One method of allocating storage space in such a situation is to provide a separate fixed area of storage for each category of information. However, this requires that each storage area must be relatively large, since it must be able to satisfy all the storage requirements of the associated category of information. This leads to considerable wastage of storage space since, at any given instant, it is to be expected that only some categories will require such a large amount of storage, while others will require very little or mone at all. Wastage can be reduced by arranging for information to be written into any available storage space. This requires the provision of a table to keep a record of where each item of information has been stored, and some form of relatively complex store management system to control the use of the store. However, this results in information of the same category being dispersed throughout the store, instead of being kept in sequential locations and this can be a disadvantage in some situations e.g. where the information is microprogram material which is normally executed sequentially.

SUMMARY OF THE INVENTION

One object of the present invention is to provide a novel way of allocating storage space in a data processing system.

According to the invention, there is provided a data processing system wherein information of at least two categories is written into at least two stacks in a store, one stack for each category, the two stacks advancing towards each other from separate base addresses as information is added to them.

It will be seen that, in such a system, the two categories share a common storage space, but will only clash in their demands for storage space if their total demand is greater than the available space. This permits the storage space to be smaller than the total storage space which would be required if separate storage areas had been provided. However, since each category has a separate stack, the information in it can still be kept in sequential locations.

Preferably, one of the stacks has priority so that it can overwrite the other when they meet. In a preferred form of the invention, if no space is found available for information to be added to either the higher or the lower priority stack, all of the lower priority stack is removed to provide space for the information to be added.

In an embodiment of the invention, there may be at least a third category of information which is written into a third stack starting at a third base address and advancing towards the other two stacks as information is added to it. Conveniently, this third stack may have priority over at least one of the first two stacks.

The invention is particularly applicable to a system in which the store is a microprogram store and the information to be written into that store comprises blocks of microprogram read from a main store.

BRIEF DESCRIPTION OF THE DRAWINGS

One data processing system in accordance with the invention will now be described by way of example, with reference to the accompanying drawings, of which.

DESCRIPTION OF THE PREFERRED EMBODIMENT

Figure 1:
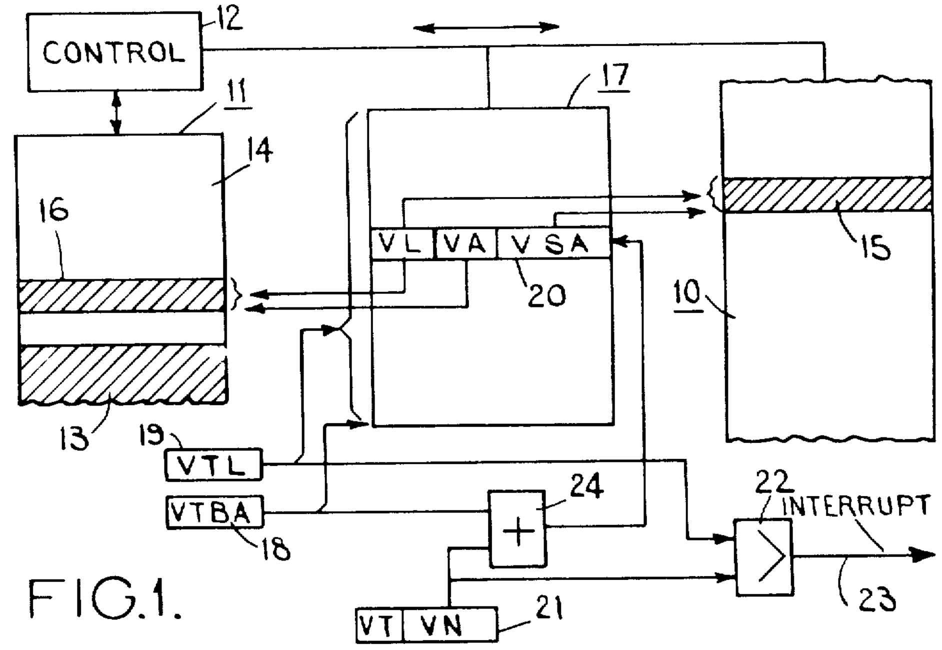
FIG. 1 is a schematic block diagram of a part of the system.

Referring to FIG. 1, the system comprises a main store 10, for holding data and program material, a microprogram store 11, and a microprogram control unit 12. In operation, the control unit 12 fetches program instructions from the main store 10 and, for each instruction, initiates an appropriate sequence of micro-instructions from the microprogram store 11 for execution of the instruction. Such microprogram control of a data processing system is, of course, well known in the art and in any case the detailed structure of the microprogram control unit 12 forms no part of the present invention.

The microprogram store 11 is of relatively small size compared with the main store 10, but has a much faster access time so as to provide virtually immediate access to the micro-instructions for the microprogram unit. One area 13 of the microprogram store is reserved for basic microprogram material (referred to as the "primitive interface") which is required for basic control of the system, this material being permanently resident in the microprogram store. The remaining area 14 of the microprogram store is available for holding copies of a number of blocks of additional microprogram material which are in current use by the system. One area of the main store 10 serves as a back-up store for holding master copies of all the blocks of microprogram in the system. Any one of these blocks can be transferred into the microprogram store 11 when called for, for use by the microprogram unit 12. The transferred block will, in general, overlay some of the information already in the microprogram store and for this reason the blocks of microprogram are hereinafter referred to as "overlays". In FIG. 1, the master copy in the main store 10 of one such overlay is indicated by the shaded area 15, while the corresponding copy in the microprogram store is indicated by the shaded area 16.

It will be seen that the provision of this back-up area for overlays, and the facilities for overlaying the microprogram store permits the system to have a large amount of microprogram available to it without the necessity for providing a very large, very fast microprogram store, which would be extremely expensive.

In the present embodiment, microprogram overlays are classified into two categories:

i. System overlays. These are blocks of microprogram material which, in effect, constitute extensions of the primitive interface material to extend the range and efficiency of the system. For example, they may perform supervisory functions such as page turning, or may be required for emulation, i.e. imitation of another machine having a different order code and system architecture. Generally, system overlays will originate from the mainframe computer manufacturer.

ii. User overlays. These are blocks of microprogram material for performing special tasks which may be required frequently in a particular application, e.g. square root routines. In general, these overlays will be written by the system user, rather than the manufacturer.

Clearly, to some extent, this classification is arbitrary, and should be considered as being done solely for onvenience.

The transfer of overlays between the main store 10 .nd the microprogram store is controlled by use of an ıverlay table 17 which is, in fact, a part of the main tore 10, and is defined by two registers: the overlay able base address register 18 which contains the adlress VTBA of the start of the overlay table within the nain store, and the overlay table length register 19, ·hich contains the length VTL of the overlay table. 'he overlay table 17 contains one entry for each overay in the system. Each entry comprises:

i. A field VL which defines the length of the overlay (i.e. the number of microinstructions in the overlay). In general, different overlays will be of different lengths.

ii. A field VA which defines the start address of the overlay in the microprogram store. If the overlay is not currently resident in the microprogram store, this field is set to zero.

iii. A field VSA which defines the start address of the master copy of the overlay in the main store.

One such table entry 20, for the overlay copies 15 nd 16, is shown in FIG. 1, in which the relationship beween the fields VL, VA and VSA and the overlays 15, 6 is indicated by arrows.

When the program of the system requires to use a ·articular microprogram overlay, it issues a call intruction which involves placing a descriptor in a decriptor register 21. This descriptor comprises:

i. A single bit VT which defines the overlay type. VT = 0 indicates a user overlay, while VT = 1 indicates a system overlay.

ii. A field VN which identifies the position in the overlay table of the entry relating to the required overlay.

The field VN is applied to a comparator 22 which ompares its value with the overlay table length VTL ·om register 19. If VN is larger than VTL, an error ıust have occurred, and therefore an interrupt signal generated on path 23 so as to cause an entry into an ppropriate interrupt routine in the primitive interface 3. Assuming, however, that VN is not larger than 'TL, the value of VN is applied to an adder 24 where is added to the value VTBA from the register 18 to ›rm the address of the appropriate entry in the overlay ıble 17. The field VA of the entry is read out, and is sed to address the microprogram store 11. Assuming ıat a copy of the required overlay is, in fact currently esident in the microprogram store, this causes a jump › the start of the overlay within that store. If, however, copy of the required overlay is not currently resident ı the microprogram store 11, the value of VA will be zero, so that the microprogram store will be accessed at its zero address location. This location contains a jump instruction which causes a jump to a special overlay routine, within the primitive interface 13, which controls the loading of a copy of the required overlay from the main store 10 into the microprogram store 11.

Figure 2:
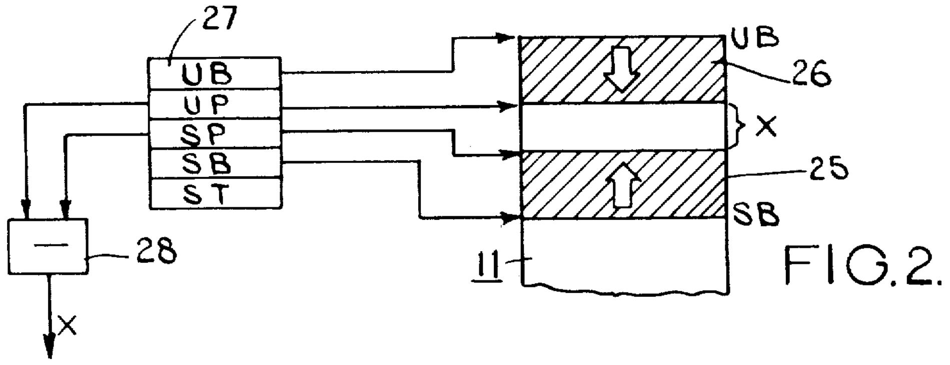
FIG. 2 is a schematic block diagram of another part of the system.

Referring now to FIG. 2, the overlay routine places overlays from the main store into two stacks 25 and 26 in the microprogram store 11, according to the overlay type. System overlays are placed in the stack 25, which extends upwards in the microprogram store (i.e. in the direction of increasing address value) from a base address SB. Normally this base address will be equal to the first free address above the boundary of the primitive interface. User overlays are placed in the stack 26, which extends downwards in the microprogram store from a base address UB, which may be the upper limit of the store. Thus, as overlays are added to the two stacks, they will advance towards each other until eventually they will meet. When this happens, the system overlay stack 25 has priority, and can overwrite the user overlay stack 26 as will be described.

The overlay routine uses a set of registers 27 which may in fact, be resident in the first locations of the overlay 17. (FIG. 1). These registers respectively contain the following values:

UB — the base address of the user overlay stack 26.

UP — a pointer to the first free address at the front of the user overlay stack.

SP — a pointer to the first free address at the front of the system overlay stack 25.

SB — the base address of the system overlay stack.

ST — the total number of system overlays in the system overlay stack.

The relationship between these registers and the locations in the microprogram store are indicated by arrows in FIG. 2.

The contents of the UP and SP registers are subtracted and incremented by one in a subtractor circuit 28 to produce a value $X = UP - SP + 1$ which, it will be seen represents the amount of free space available for writing further overlays into, between the fronts of the two stacks 25 and 26.

The first action of the overlay routine is to examine the contents of the VT field in the descriptor register 21 (FIG. 1) to determine the descriptor type. If VT = 0, indicating a user overlay, the part of the overlay routine shown in FIG. 3 is performed, while if VT = 1, indicating a system overlay, the part of the overlay routine shown in FIG. 4 is performed.

Figure 3:
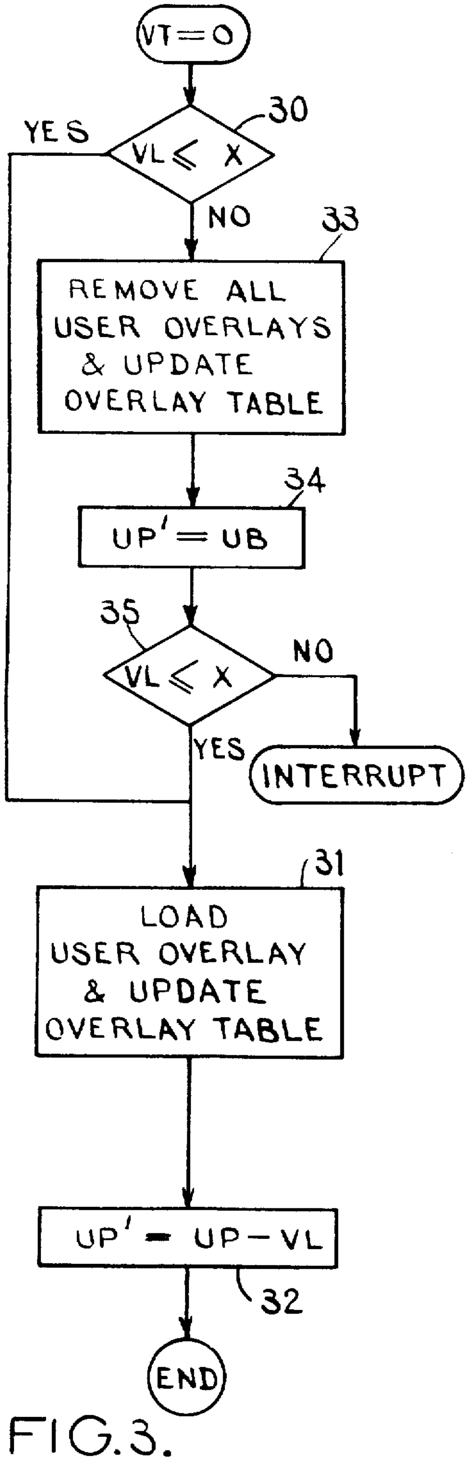
FIGS. 3 – 5 illustrate microprograms of the system.

Referring to FIG. 3, in the case of a user overlay the value of VL from the currently addressed entry in the overlay table 17 is compared (box 30) with the value X from the circuit 28 to determine whether there is enough free space available in the microprogram store between the stack fronts to hold the new overlay. If VL is smaller than or equal to X, the overlay can be immediately loaded (box 31) into locations $UP - VL + 1$ up to UP of the microprogram store, so as to extend the user overlay stack in a downward direction. At the same time, the overlay table 17 is updated by writing the start address $UP - VL + 1$ of the new overlay into the field VA. Finally, the pointer address register UP is updated (box 32) by subtracting the value VL from it. This completes the overlay routine for this case.

Returning to box 30, if it is found that VL is larger than X, then clearly the new overlay will not fit into the available space. To make room for it, all the overlays currently in the user overlay stack 26 are removed (box 33). As each overlay is removed, its corresponding entry in the overlay table 17 is updated by setting the field VA to zero to indicate that the overlay is no longer resident in the microprogram store. The pointer UP is then updated (box 34) by setting it equal to UB, The value of VL is again compared with X (box 35). If VL is still too large, even after removal of all the user overlays, then nothing more can be done by the overlay routine and an interrupt signal is produced. If, however, VL is now smaller than or equal to X, the overlay routine can be completed as already described (boxes 31 and 32).

Figure 4:
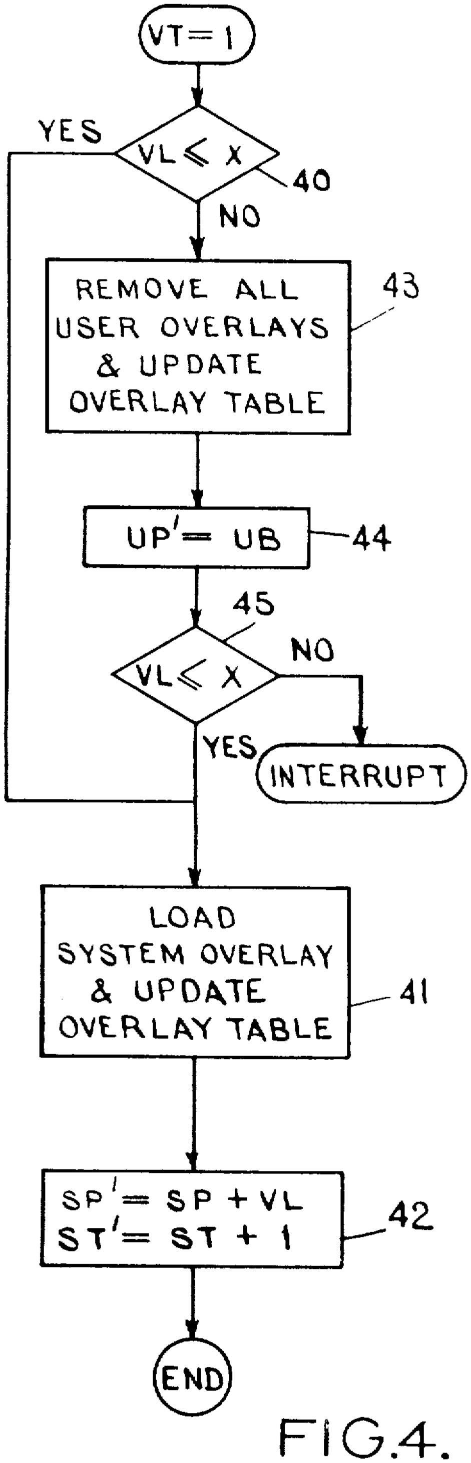

Referring now to FIG. 4, in the case of a system overlay, the value of VL is again compared with X (box 40) to determine whether there is enough free space for the overlay. If VL is smaller than or equal to X, the overlay can be immediately loaded (box 41) into locations SP up to $SP + VL - 1$ of the microprogram store so as to extend the system overlay stack upwards. At the same time, the overlay table 17 is updated by writing the start address SP of the new overlay into the field VA. Finally, the pointer address register SP is updated (box 42) by adding the value VL to it, and the value ST (the number of system overlays in the stack) is incremented by one. This completes the overlay routine for this case.

Returning to box 40, if VL is larger than X, then clearly the new system overlay will not fit into the available space. However, the system overlay stack has priority over the user overlay stack and so, to make room for the new system overlay, all the overlays currently in the user overlay stack 26 are removed (box 43). As each overlay is removed, its corresponding entry in the overlay table 17 is updated by setting the field VA to zero. The pointer UP is then updated (box 44) by setting it equal to UB. The value of VL is again compared with X (box 45). If VL is still too large, even after removal of all the user overlays, an interrupt signal is produced. If, however, VL is now smaller than or equal to X, the overlay routine can be completed as before (boxes 41 and 42).

It will be apparent from the above description that user overlays are removed automatically by the overlay routine when the space occupied by them is required, either by new user overlays or by system overlays. System overlays, on the other hand, can only be removed by a special "clear system overlay" instruction which initiates a corresponding routine in the primitive interface of the microprogram. Any desired number of the system overlays can be removed in this way, on a "last in, first out" basis, the number R to be removed being specified by the instruction.

Figure 5:
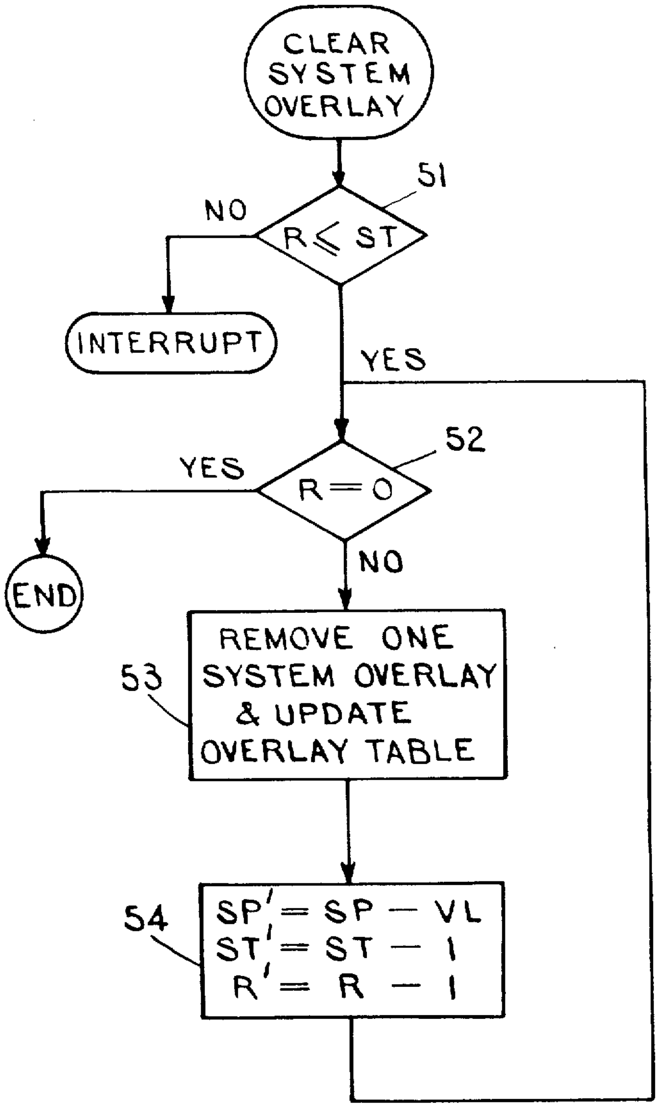

Referring now to FIG. 5, this shows the microprogram routine for executing the clear system overlay instruction. The first step is to compare (box 51) the values of R (the number of system overlays to be removed) and ST (the number of system overlays in the microprogram store). If R is greater than ST, then clearly an error has occurred and an appropriate interrupt is produced. Otherwise, the next step is to test (box 52) whether R is equal to zero. Assuming it is non-zero, the next step is to remove (box 53) one system overlay from the front of the system overlay stack 25 and to update the corresponding overlay table entry by setting the field VA to zero. The registers 27 are then updated (box 54) by subtracting the length VL of the removed overlay from SP, and decrementing ST by one. The value of R is also decremented by one. A return is then made to box 52 to test whether R is now zero. If it is, the required number of system overlays has now been removed and hence the routine has been completed. If not, the loop 53, 54, 52 is repeated until eventually R reaches zero.

A facility may be provided for altering the base address SB, in response to an appropriate instruction, so as to cause one or more of the system overlays to be temporarily treated as part of the primitive interface (i.e. prevent them from being removed from the stack). The value of ST must also be altered when the base address SB is altered in this way.

Figure 6:
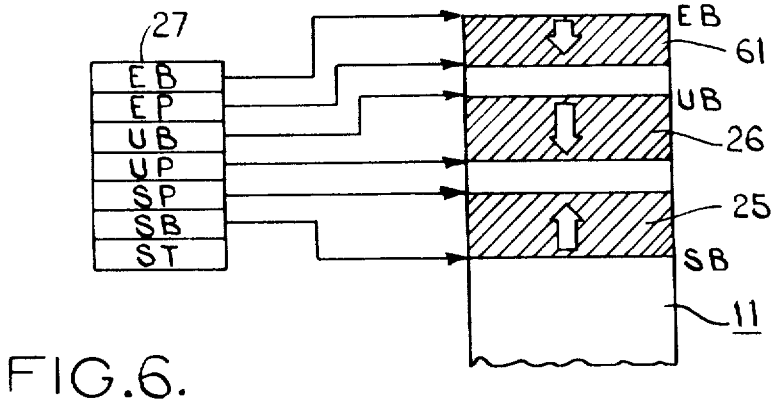
FIG. 6 illustrates a modification to the system.

Referring now to FIG. 6, in a modification of the system described above, a third category of overlay may be catered for. This third category may, for example, comprise emulation overlays which were previously considered as part of the system overlays. In this modification the emulation overlays are written into a third stack 61 in the microprogram store, which starts from a base address EB, higher than the base address UB of the user overlay stack, and advances downwards towards the other two stacks. Preferably, the emulation overlay stack 61 has priority over the user overlay stack 26, and also the system overlay stack 25, so that it can overwrite each of these. However, the emulation overlay is not allowed to overwrite the primitive interface material (or system overlay material temporarily being treated as such) below the address SB.

Two additional registers are provided in the set 27 to hold the base address (EB) of the stack 61 and a pointer address (EP) pointing to the first free location at the front of the stack 61. The descriptor in register 21 (FIG. 1) must now have a two-bit field VT to identify three different overlay types, and the overlay routine must be extended to handle loading of emulation overlays. In addition, a "clear" routine similar to that shown in FIG. 5 may be provided for clearing emulation overlays.

In another modification of the system described above, the system includes two separate processing units which share the same microprogram store 11, each unit being allocated a separate area of the microprogram store for containing its microprogram. The units also share the main store 10. In this case, the overlay table 17 is extended, so that each entry now contains one set of fields VL, VA, VSA for an overlay relating to one of the processing units, and a similar set of fiields for an overlay relating to the other unit. In addition, two sets of registers 27 must now be provided, one for each of the processing units.

Although the invention has been described in relation to overlaying microprogram in a microprogram store, it will be appreciated that it is more gennerally applicable to many situations where information of two or more categories is written into a store.

We claim:

1. A data processing system comprising: an information store; means for writing information of a first category into the store, in a first stack advancing, as information is added to it, in a first predetermined direction from a first base address; and means for writing information of a second category into the store, in a second stack advancing, as information is added to it, in a second predetermined direction opposite to said first direction from a second base address spaced from said first base address in said first direction.

2. A system according to claim 1, further including means for producing an indication of the free space between the two stacks, and means for removing all the information from the second stack in the event that information to be added to either stack is larger than said free space indication.

3. A system according to claim 2, further including means for removing any specified number of blocks of information from said first stack.

4. A system according to claim 1, further including means for writing information of a third category into the store, in a third stack advancing, as information is added to it, in said second direction from a third base address spaced from said second base address in said first direction.

5. A system according to claim 1, wherein information in the store to the side of said first base address remote from said second base address cannot be removed from the store, and including means for varying the first base address to temporarily prevent a portion of the information in the first stack from being removed.

6. A data processing system comprising: a microprogram store; a main store having a slower access time but a larger capacity than the microprogram store and containing master copies of blocks of microprogram material of first and second categories; means for writing blocks of the first category into the store, in a first stack advancing, as blocks are added to it, in a first predetermined direction from a first base address; means for writing blocks of the second category into the microprogram store, in a second stack advancing, as blocks are added to it, in a second predetermined direction opposite to said first direction from a second base address spaced from said first base address in said first direction; and a microprogram control unit for executing sequences of micro-instructions in the microprogram store.

* * * * *